Patented May 17, 1938

2,117,619

UNITED STATES PATENT OFFICE 2,117,619

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application August 26, 1937, Serial No. 161,090

19 Claims. (Cl. 260—112)

This invention relates to an improved process for the manufacture of ammonium dithiocarbamate.

The objects of the invention are the manufacture of ammonium dithiocarbamate of high purity, in yields which approach theory and at an economical cost. These objects have not been previously attainable by the methods described in the literature.

Previous workers used alcohol as a diluting medium or diluent for the interaction of carbon disulfide and ammonia to form ammonium dithiocarbamate. Poor yields of rather impure ammonium dithiocarbamate were obtained.

According to the present invention, carbon disulfide is dissolved in an ester, which serves as a diluent, and ammonia is passed in. Ammonium dithiocarbamate is formed as a crystalline compound and precipitates almost immediately.

Esters which may be used as diluents according to this invention are varied and include, among others, esters of the saturated acids of the fatty acid series. These include alkyl esters as ethyl formate, methyl acetate, ethyl acetate, isopropyl acetate, butyl acetate, amyl acetate, octyl acetate, ethyl propionate, butyl butyrate, ethylidene diacetate, glycerol triacetate. Alkyl esters of the higher members of the fatty acid series as methyl myristate, butyl myristate, propyl stearate, butyl stearate are also satisfactory diluents. Alkoxy alkyl esters as ethylene glycol monoethyl ether acetate, aryl esters as phenyl acetate and o-tolyl acetate; aralkyl esters as benzyl acetate, may likewise be used.

Esters of many other acids may be used in place of esters of the saturated acids of the fatty acid series. These include esters of keto acids as ethyl acetoacetate; esters of aromatic acids as methyl benzoate and dibutyl phthalate; esters of hydroxy aromatic acids as ethyl salicylate; esters of hydroxy aliphatic acids as ethyl glycollate, ethyl lactate, dibutyl tartrate, ethyl citrate; esters of aliphatic di-basic acids as ethyl oxalate, ethyl malonate; esters of olefinic acids as ethyl crotonate, ethyl oleate, ethyl maleate; esters of orthosilicic acid as ethyl ortho silicate; esters of carbonic acid as diethylcarbonate; esters of phosphoric acid as n-butyl phosphate.

The reaction conditions according to this invention do not require the use of pure esters. If desired, varying amounts of organic diluents, such as hydrocarbons, may be added to the ester. The best results are obtained, however, when the major part of the diluent consists of an ester or esters.

The reaction is preferably carried out in a reactor provided with some cooling device such as a jacket for circulating brine. Approximately one molecular proportion of carbon disulfide is dissolved in the diluting ester. Approximately two molecular proportions of gaseous ammonia are passed in, with agitation.

The temperature for carrying out the reaction may be varied widely. A range of 15° to 35° C. is convenient for operating purposes and gives satisfactory results. Lower temperatures may also be employed. The temperature range 35° to 65° C. may be successfully employed but has the disadvantage that the rate of reaction is slower, probably because of diminished solubility of ammonia at the higher temperatures.

The reaction can also be carried out at a pressure greater than atmospheric in which case loss of ammonia is prevented.

After a short period of ammonia addition, ammonium dithiocarbamate crystallizes out, being only sparingly soluble in the diluting esters commonly employed. When the required amount of ammonia has been added, agitation is preferably continued for a short time, and the ammonium dithiocarbamate is then filtered off. The product may be air dried to remove esters. If higher boiling esters are employed, a wash with an inert, volatile solvent is desirable.

A modification in this procedure may be adopted when a water solution of ammonium dithiocarbamate is desired. Water is added to the suspension of ammonium dithiocarbamate in the diluting ester, the product is readily dissolved, and its water solution separated from the ester. An advantage of this alternative method is the fact that a water solution of ammonium dithiocarbamate is more stable than the dry powder.

In either method, some purification of the diluting ester before further use in the process is necessary to maintain the high purity of the ammonium dithiocarbamate. While distillation gives satisfactory results, washing with a strong caustic solution removes the small amount of impurities in solution in the ester. If the water extraction modification is used, the caustic wash serves also as a drying agent. Loss of ester during purification represents only a small fraction of a pound per pound of ammonium dithiocarbamate produced.

The following examples describe the process more specifically, but it will be understood that the invention is not limited to these details. Wide variations both in the process and amounts of reactants are possible without materially affecting the results.

*Example 1.*—20 gals. of ethyl acetate are placed in a reactor provided with a cooling bath. 38 lbs. of carbon disulfide are added. Agitation is started and ammonia gas introduced through an inlet pipe extending into the reactor. Within a few minutes almost white crystals of ammonium dithiocarbamate crystallize out.

With the temperature maintained at 15–20° C., ammonia addition is continued until 15.4 lbs. have been added. After agitating a short time longer, the ammonium dithiocarbamate is filtered off and air dried. 47 lbs. of ammonium dithiocarbamate are produced, representing a 94% yield.

*Example 2.*—The process essentially as set forth in Example 1 is carried out in a flask using 1500 cc. of isopropyl acetate and 319 g. of carbon disulfide. 136 g. of ammonia gas are passed in. 415 g. of ammonium dithiocarbamate are produced, representing a 94% yield.

Using the same amounts of materials, the water extraction modification is applied. Instead of filtering after the reaction is complete, 450 cc. of water are added. The weight increase of the water layer is 430 g., representing a yield of approximately 98%. The isopropyl acetate is practically insoluble in the concentrated solution of ammonium dithiocarbamate and is readily separated therefrom.

*Example 3.*—Using 500 cc. ethyl carbonate, 76 g. of carbon disulfide and 34 g. of ammonia, the process described in Example 1 is carried out in a flask. 99 g. of ammonium dithiocarbamate are obtained. The yield is 90%.

The process may be carried out as explained in the examples, using the wide variety of esters previously described. The invention is not limited to the use of esters specifically named or necessarily to esters of the general groups of acids listed.

From the data herein presented the fact will be readily apparent that this invention constitutes a distinct improvement over previous processes for preparing ammonium dithiocarbamate. Yields have been increased to over 90%. The quality of ammonium dithiocarbamate has been greatly improved making purification unnecessary before use of the compound for synthetic work. By this improvement in quality a distinctly more stable compound is obtained. Conditions for its preparation according to this invention do not require close control. A wide temperature range may be used; the amounts of reactants may be varied greatly from those theoretically required, without affecting adversely either the yield or quality of ammonium dithiocarbamate produced. Other organic diluents may be added to the ester. By reason of the ease of purification and small loss of diluting ester, ammonium dithiocarbamate may be inexpensively prepared by the process described.

The term "ester" as used herein refers to esters of oxygen acids and does not include such compounds as alkyl halides. At present, the moderately volatile esters of simple fatty acids, that is, those esters of saturated fatty acids which esters contain a total of more than three but less than eight carbon atoms, are preferred because of their ready availability at low cost, and the ease with which the product can be separated therefrom by filtration or water extraction. Ammonium dithiocarbamate is moderately soluble in a few hydroxy esters, such as ethyl glycolate, and to a lesser extent in the esters of very low molecular weight, but is practically insoluble in all other esters, including the preferred class just referred to.

I claim:
1. A process for the manufacture of ammonium dithiocarbamate which comprises interacting ammonia and carbon disulfide in the presence of an ester as a diluent.
2. A process for the manufacture of ammonium dithiocarbamate which comprises interacting ammonia and carbon disulfide in the presence of a volatile, liquid ester as a diluent.
3. A process for the manufacture of ammonium dithiocarbamate which comprises interacting ammonia and carbon disulfide in the presence of a volatile, liquid ester of low water solubility, and extracting the product therefrom with water.
4. A process for the manufacture of ammonium dithiocarbamate which comprises interacting substantially one molecular proportion of carbon disulfide and substantially two molecular proportions of ammonia in a diluting medium consisting of a liquid ester, at a temperature below 60° C.
5. A process for the manufacture of ammonium dithiocarbamate which comprises introducing gaseous ammonia into carbon disulfide diluted with a liquid ester in which the solubility of ammonium dithiocarbamate is slight, at a temperature below 60° C.
6. A process for the manufacture of ammonium dithiocarbamate which comprises interacting carbon disulfide and ammonia in the presence of a member of the group consisting of alkyl, alkoxyalkyl, aralkyl and aryl esters of saturated acids of the fatty acid series, of olefinic acids, of keto acids, of aromatic acids, of hydroxy aromatic acids, of aliphatic dibasic acids, of hydroxy aliphatic acids, of boric acid, of phosphoric acid, of ortho silicic acid, and of carbonic acid.
7. A process according to claim 6, in which substantially one molecular proportion of carbon disulfide is caused to react with substantially two molecular proportions of ammonia, and the temperature is maintained below 60° C.
8. A process according to claim 6, in which the diluting ester has a low water solubility, and the product is extracted therefrom with water.
9. A process for the manufacture of ammonium dithiocarbamate which comprises interacting carbon disulfide and ammonia in a diluting medium consisting of an ester of a saturated acid of the fatty acid series.
10. A process according to claim 9 in which the diluting ester has a low water solubility, and the product is extracted therefrom with water.
11. A process for the manufacture of ammonium dithiocarbamate which comprises interacting substantially one molecular proportion of carbon disulfide with substantially two molecular proportions of ammonia in a diluting medium consisting of an ester of a saturated acid of the fatty acid series, at a temperature maintained below 60° C.
12. A process for the manufacture of ammonium dithiocarbamate which comprises interacting carbon disulfide and gaseous ammonia in a diluting medium consisting of an ester of a saturated acid of the fatty acid series, such ester containing more than three and less than eight carbon atoms.
13. A process according to claim 12 in which the diluting ester has a low water solubility, and the product is extracted therefrom with water.

14. A process for the manufacture of ammonium dithiocarbamate which comprises interacting substantially one molecular proportion of carbon disulfide with substantially two molecular proportions of ammonia in a diluting medium consisting of an ester of a saturated acid of the fatty acid series, such ester containing more than three and less than eight carbon atoms, at a temperature maintained below 60° C.

15. A process for the manufacture of ammonium dithiocarbamate which comprises interacting carbon disulfide and ammonia in a diluting medium consisting of isopropyl acetate.

16. A process for the manufacture of ammonium dithiocarbamate which comprises passing substantially two molecular proportions of gaseous ammonia into substantially one molecular proportion of carbon disulfide diluted with isopropyl acetate, at a temperature below 60° C.

17. A process according to claim 16 in which the ammonium dithiocarbamate is extracted from the isopropyl acetate with water.

18. A process for the manufacture of ammonium dithiocarbamate which comprises interacting carbon disulfide and ammonia in a diluting medium consisting of ethyl acetate.

19. A process for the manufacture of ammonium dithiocarbamate which comprises interacting carbon disulfide and ammonia in a diluting medium consisting of butyl acetate.

ROGER A. MATHES.